(12) United States Patent
Yeh (10) Patent No.: US 8,692,813 B2
(45) Date of Patent: Apr. 8, 2014

(54) BENDABLE STYLUS

(75) Inventor: Ying-Hao Yeh, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 607 days.

(21) Appl. No.: 12/629,056

(22) Filed: Dec. 2, 2009

(65) Prior Publication Data

US 2010/0302213 A1     Dec. 2, 2010

(30) Foreign Application Priority Data

Jun. 2, 2009 (TW) ................................ 98118176 A (51) Int. Cl.
*G06F 3/033* (2013.01)

(52) U.S. Cl.
USPC .......................................................... 345/179

(58) Field of Classification Search
None
See application file for complete search history.

(56) References Cited

U.S. PATENT DOCUMENTS

| | | | | |
|---|---|---|---|---|
| 6,464,419 | B1 * | 10/2002 | Chan | 401/131 |
| 6,474,892 | B2 * | 11/2002 | Chao | 401/195 |
| 7,425,948 | B2 * | 9/2008 | Ling et al. | 345/179 |
| 7,541,987 | B2 * | 6/2009 | Kyou et al. | 343/702 |
| 8,054,613 | B2 * | 11/2011 | Hsu et al. | 361/679.01 |
| 2002/0118181 | A1 * | 8/2002 | Sekendur | 345/179 |
| 2002/0158854 | A1 * | 10/2002 | Ju | 345/179 |
| 2003/0184529 | A1 * | 10/2003 | Chien et al. | 345/179 |
| 2004/0160431 | A1 * | 8/2004 | DiMambro et al. | 345/179 |
| 2006/0044288 | A1 | 3/2006 | Nakamura | |
| 2007/0117430 | A1 | 5/2007 | Lin | |

FOREIGN PATENT DOCUMENTS

| | | |
|---|---|---|
| CN | 1979393 A | 6/2007 |
| DE | 1435019 | 3/1969 |
| TW | M317082 | 8/2007 |
| TW | I294092 | 3/2008 |
| TW | 200826356 | 6/2008 |

OTHER PUBLICATIONS

Office action mailed on Sep. 15, 2011 for the Taiwan application No. 098118176, filing date Jun. 2, 2009, p. 1-8.
Office action mailed on Nov. 24, 2011 for the China application No. 200910147045.0, filing date Jun. 8, 2009, p. 1-4.

* cited by examiner

*Primary Examiner* — K. Wong
(74) *Attorney, Agent, or Firm* — Winston Hsu; Scott Margo (57) ABSTRACT

Stylus includes a first body at the front end and a second body at the back end, where the second body pivots to the first body and is capable of rotating between a straight position and a bending position. The stylus further includes a restraining member selectively moving to engage between the first body and the second body such that the stylus can be retained and formed in a straight pen style with buckling-proof capability, or a bending style for supporting a portable device. When the stylus is drawn out of the portable device, the restraining member can further be pushed forwardly to disengage the second body from the first body by a resilient bump inside the housing of the portable device, so that the stylus can be released from the straight pen style and bended accordingly.

28 Claims, 13 Drawing Sheets

BENDABLE STYLUS

BACKGROUND OF THE INVENTION

1. Field of the Invention

The application relates to a touch device, and more particularly, to a bendable touch device capable of supporting a portable device on a surface.

2. Description of the Prior Art

To make input of a device more convenient, most portable devices such as a mobile phone, a personal digital assistant (PDA), a portable navigation device (PND), or any integrated portable device have equipped with a touch screen. Users can directly touch the touch screen with finger or an additional stylus to make the input or operate the portable device.

Devices equipped with a stylus usually have a container that matches the size of the stylus at the side. The stylus can be stored in the container when not in use. Most styluses or touch devices of other types at the market, however, are not bendable. On the other hand, these portable devices are not only held by a user but also placed on a flat surface (such as table). Currently, no suitable supporting frame that can support the portable device can be seen to incorporate into the portable device.

SUMMARY OF THE INVENTION

The application provides a touch device that is bendable for use as a support frame for a portable device when a portion of the touch device reaches out of the portable device. When the touch device is drawn out of the portable device, it can be set and retained at a straight pen style for use as a stylus and it is buckling-proof.

The application provides a bendable touch device. The touch device includes a first body, a second body pivoting to the first body and convertible between a first position and a second position relative to the first body, and a restraining member moveable to engage between the first body and the second body so as to retain the second body at the first position.

The application also provides a portable device having a bendable touch device. The portable device includes a housing having a container and a touch device moveably contained in the container and releasable from the housing by moving out of the container. The touch device includes a first body, a second body pivoting to the first body and convertible between a first position and a second position relative to the first body, and a restraining member moveable to engage between the first body and the second body so as to retain the second body at the first position.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
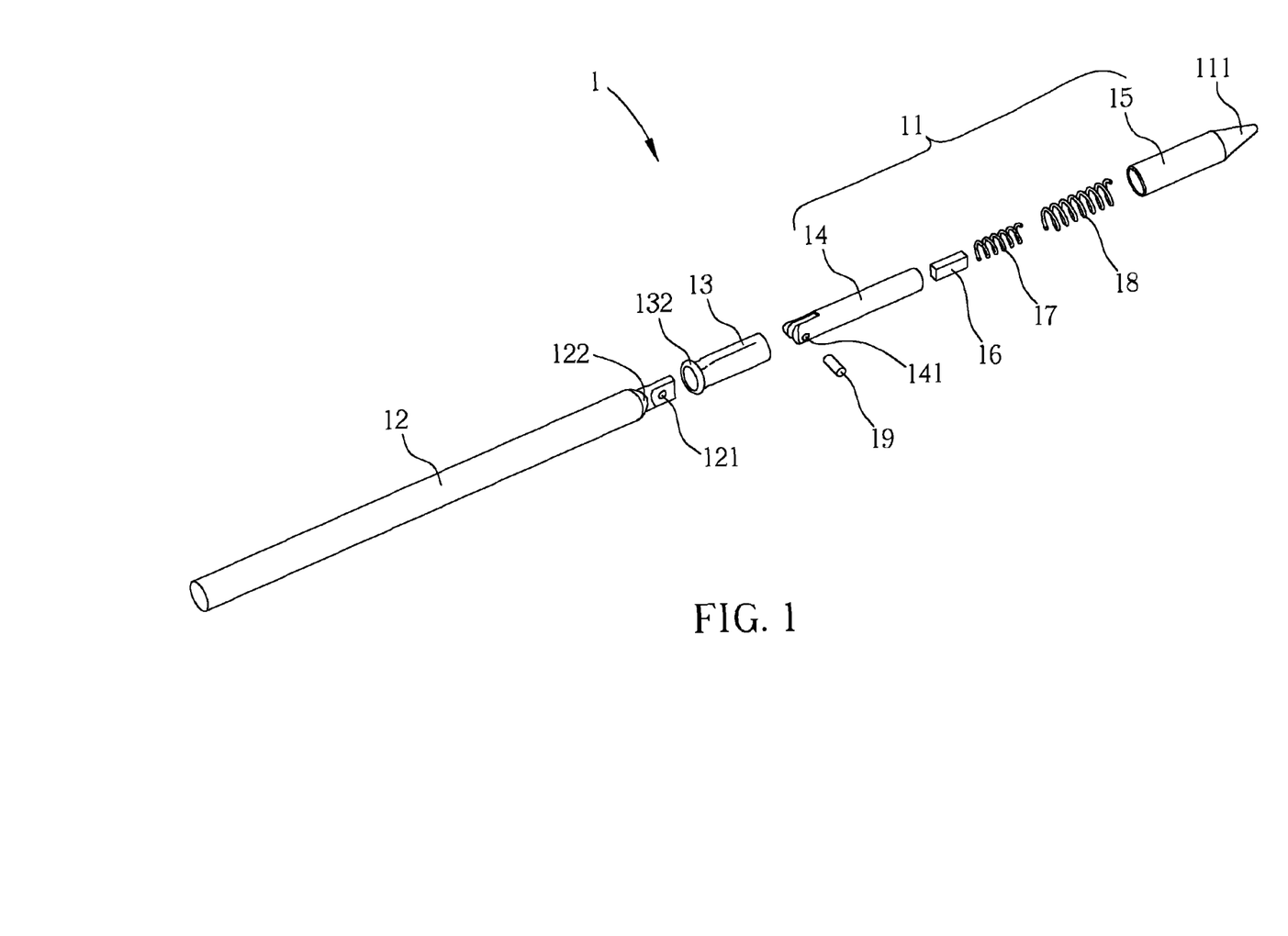
FIG. 1 is a schematic diagram of an exploded view of a touch device according to a first embodiment of the application.

Please refer to FIG. 1, which is a schematic diagram of the exploded view of a bendable touch device 1 according to a first embodiment disclosed in the application. The touch device 1 can be a stylus or touch accessory used for a mobile phone, a personal digital assistant (PDA), a smart phone, a portable navigation device (PND), a global positioning system (GPS), or integrated portable electronic devices. Such portable devices generally equip with touch screen so that the touch device 1 can operate directly on the touch screen.

Figure 2:
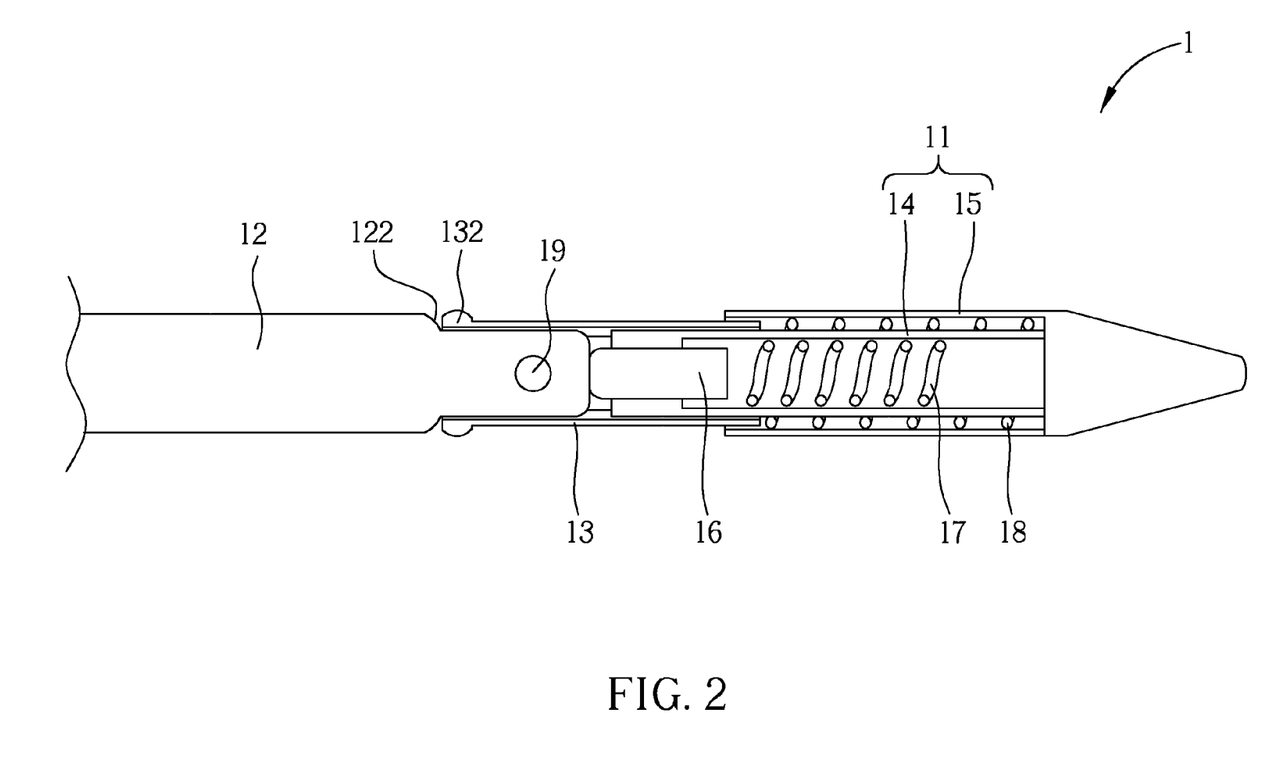
FIG. 2 is a schematic diagram of the cross-section view of the touch device according to the first embodiment.

The touch device 1 includes a first body 11 and a second body 12. The second body 12 pivots to the first body 11 and is rotatable relative to the first body 11 and convertible between a straight position and a bending position. Please refer to FIG. 1 and FIG. 2. FIG. 2 shows a schematic diagram of the cross-section view of the touch device 1 according to the first embodiment. The first body 11 includes an inner base 14 and an outer base 15. Both the inner base 14 and the outer base 15 are shallow columns according to this embodiment. The outer base 15 has a touch end 111, which is exemplified as a sharp pen head that is easy for clicking and controlling the touch screen. The inner base 14 is configured in the outer base 15 and has pivoting holes 141 at one end. The second body 12 also has pivoting holes 121 at a corresponding end facing the first body 11. The second body 12 is made rotatable to the first body 11 via passing a pivoting rivet 19 through the pivoting holes 141 and the pivoting holes 121. The touch device 1 further includes a restraining member 13 that can be a sleeve in the first embodiment and encloses around the inner base 14 of the first body 11. The restraining member 13 is also moveable relative to the inner base 14 of the first body 11. A second spring 18 also encloses around the inner base 14 and connects between the restraining member 13 and the outer base 15. The second spring 18 can be compressed by the restraining member 13 and the first body 11 and have bias for the restraining member 13 when the restraining member 13 moves on the first body 11.

As for the touch device 1 in FIG. 2, the second body 12 is retained at a straight position relative to the first body 11, and therefore the touch device 1 can be used as a stylus. When the touch device 1 is configured at a straight pen style as shown in FIG. 2, the restraining member 13 that encloses the first body 11 also encloses the second body's pivot end, which pivots to the first body 11, and at such state, the restraining member 13 engages both with the first body 11 and the second body 12, thereby restricting the second body 12 from rotating relative to the first body 11. Additionally, the restraining member 12 has a protrusion 132 that can have contact and be abutted by an abutting edge 122 of the second body 12 when the restraining member 12 encloses the second body 12, further preventing the restraining member 13 from overly sliding outward the first body 11.

Figure 3:
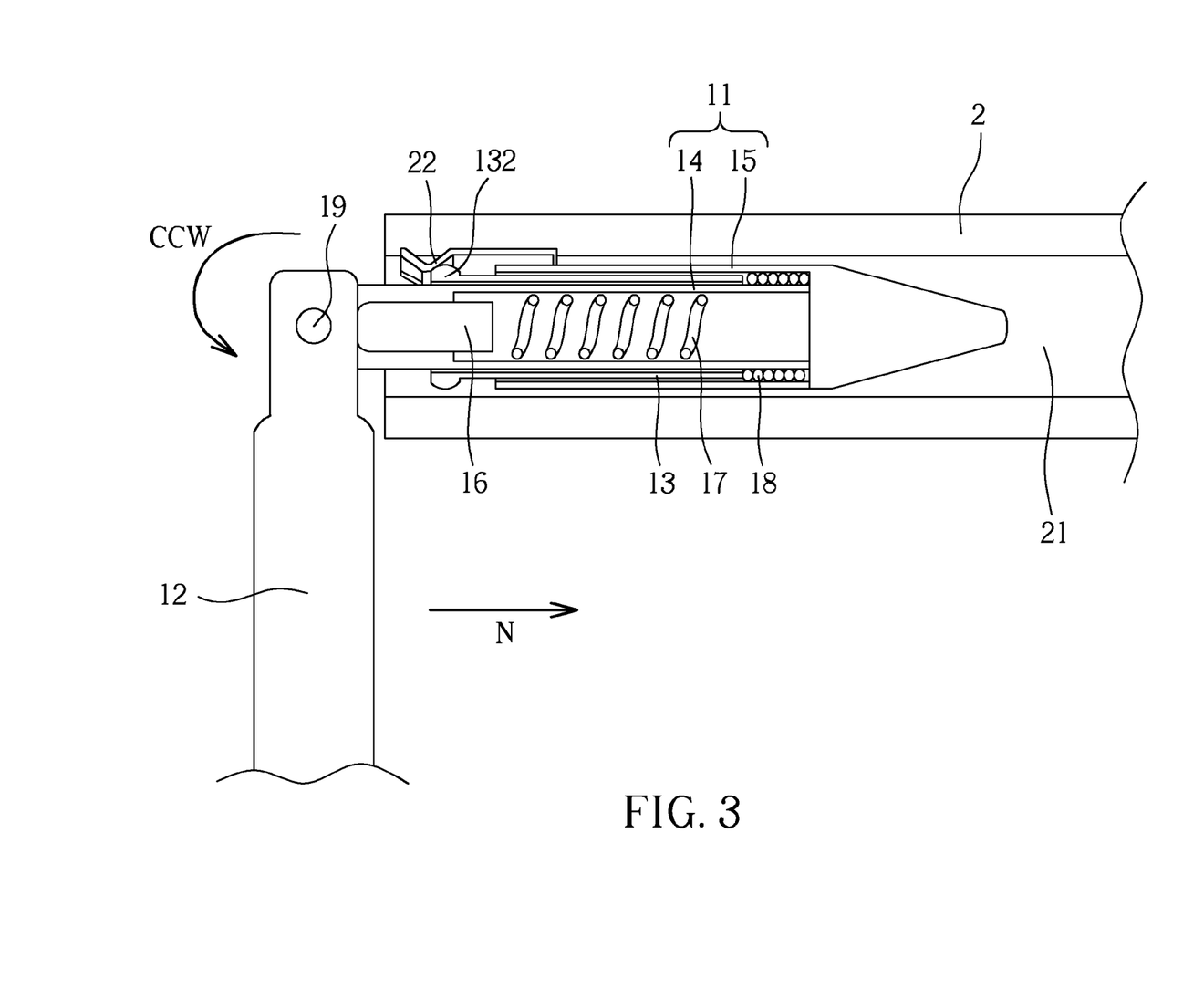
FIG. 3 is a schematic diagram of the touch device in a bending state.

The second body 12 of the touch device 1 can rotate relative to the first body 11 from the straight position as shown in FIG. 2 to a bending position as shown in FIG. 3 along a counter-clockwise (CCW) direction, while the touch device 1 is positioned straight as shown in FIG. 2 when the touch device 1 is totally contained in a container 21 of a housing 2 of a portable device. As illustrated in FIG. 3, when the touch device 1 is partially drawn out of the container 21 from the portable device along the opposite direction of direction N until a resilient bump 22 inside the container 21 pushes the protrusion 132 of the restraining member 13 toward the first body 11 along direction N and disengages the restraining member 13 from the second body 12, the second body 12 is no longer restrained by the restraining member 13 and is rotatable relative to the first body 11. The second body can be rotated to the bending position as shown in FIG. 3. Meanwhile, a second spring 18 is further connected between the restraining member 13 and the first body 11 and is compressed to have bias for pushing the restraining member 13 toward the second body 12 as the restraining member 13 is pushed by the resilient bump 22 along direction N. Since the second body 12 is at the bending position relative to the first body 11, the second spring 18 may push the restraining member 13 to only abut against the side wall of the second body 12 and enclose the first body 11 only. The restraining member 13 can further retain the second body 12 at the bending position as shown in FIG. 3 due to the second spring 18.

Figure 4:
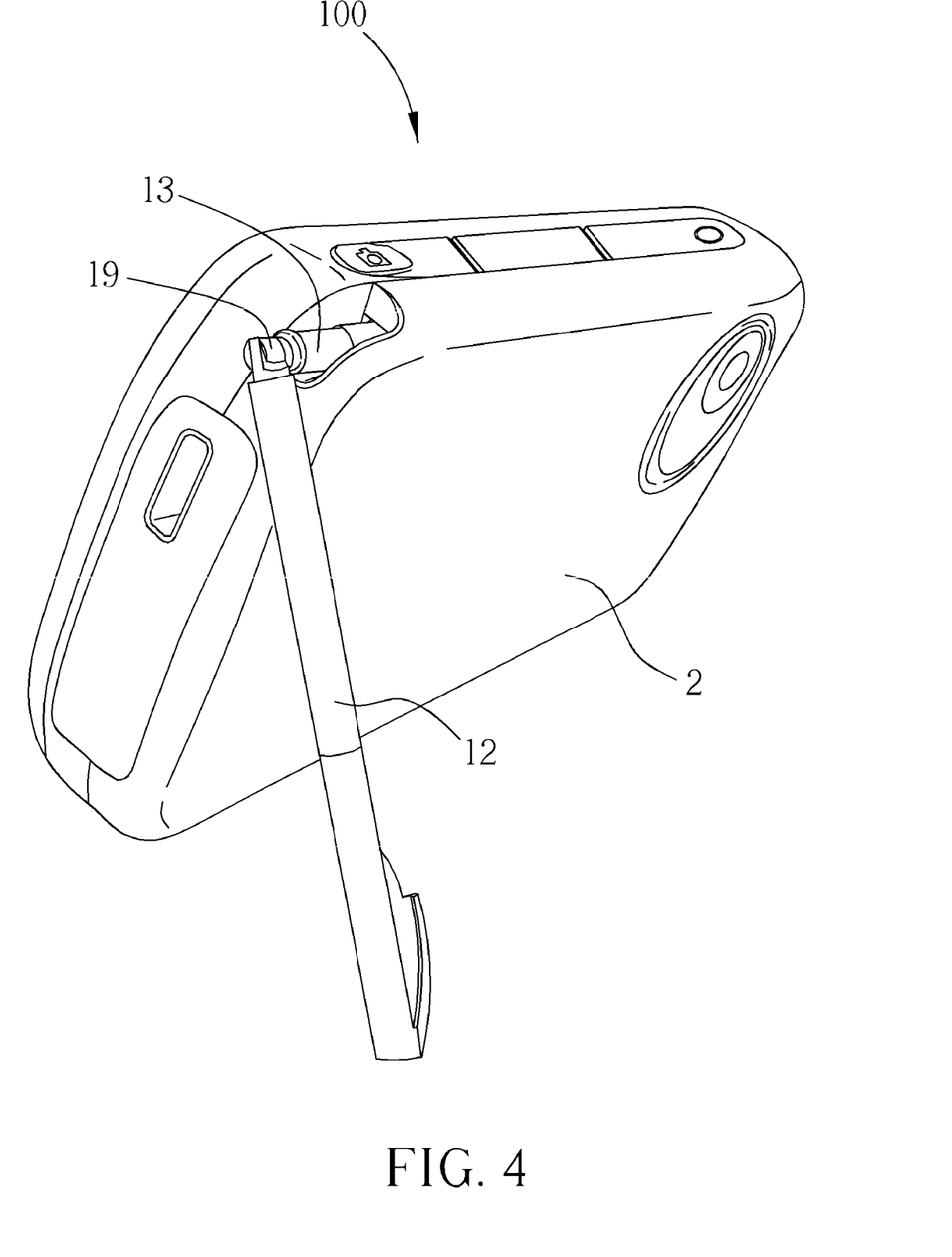
FIG. 4 is a schematic diagram showing the touch device functioning as a support frame for a portable device.

Please refer to FIG. 4. FIG. 4 is a schematic diagram showing the touch device 1 functioning as a support frame for a portable device 100. The touch device 1 is configured to have a bending style at this state, with the first body 11 remaining in the container 21 of the portable device 100 and the second body 12 bending out of the container 21. In FIG. 4, portion of the first body 11 further reaches out of the container 21 that causes the restraining member 13 to be free from the resilient bump 22 and biased by the second spring 18 to abut against the pivot end of the second body 12 such that the portable device 100 can be supported to stand straight or with an inclined angle by the touch device 1.

Please keep referring to FIG. 2 and FIG. 3. The touch device 1 further includes a block 16 and a first spring 17. The block 16 can slide in the inner base 14 of the first body 11 and the first spring 17 is configured in the hollow portion of the inner base 14 and connected between the block 16 and the first body 11. The block 16 can be pushed by the first spring 17 to abut against the pivot end of the second body 12 when the second body 12 is either at the straight position in FIG. 2 or at the bending position in FIG. 3. The block 16 can also retain the second body 12 at the straight position or the bending position and pushes the second body 12 to locate at the straight position or the bending position automatically while the touch device 1 is convertible between the straight pen style and the bending style.

Figure 5:
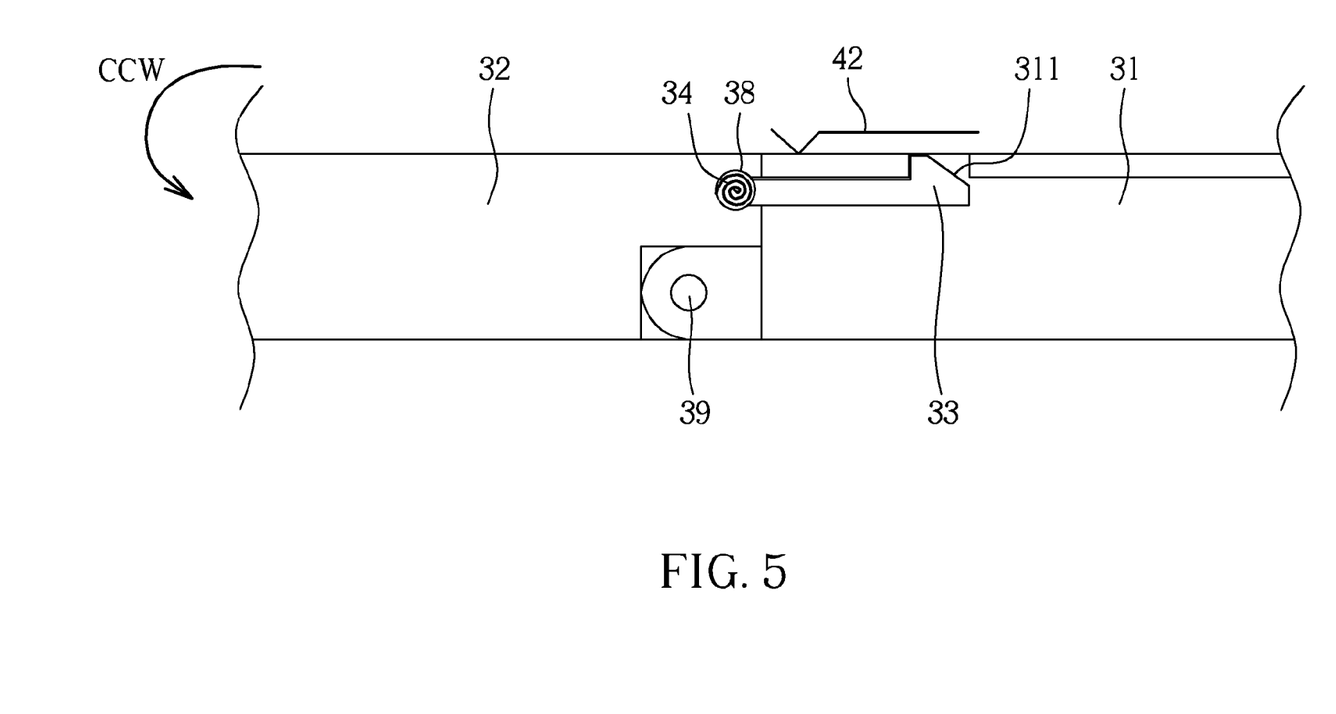
FIG. 5 is a schematic diagram of a touch device according to a second embodiment of the application.
Figure 6:
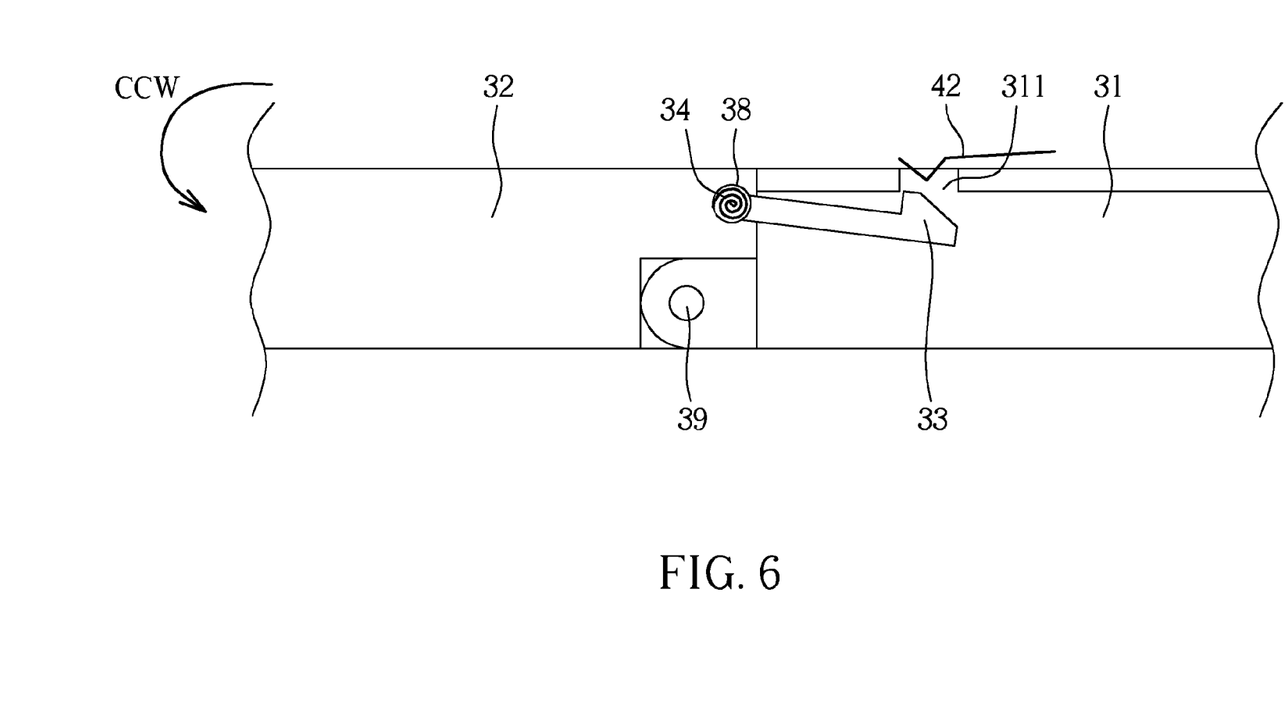
FIG. 6 is a schematic diagram showing that the touch device is pushed to release by a resilient bump of a portable device.
Figure 7:
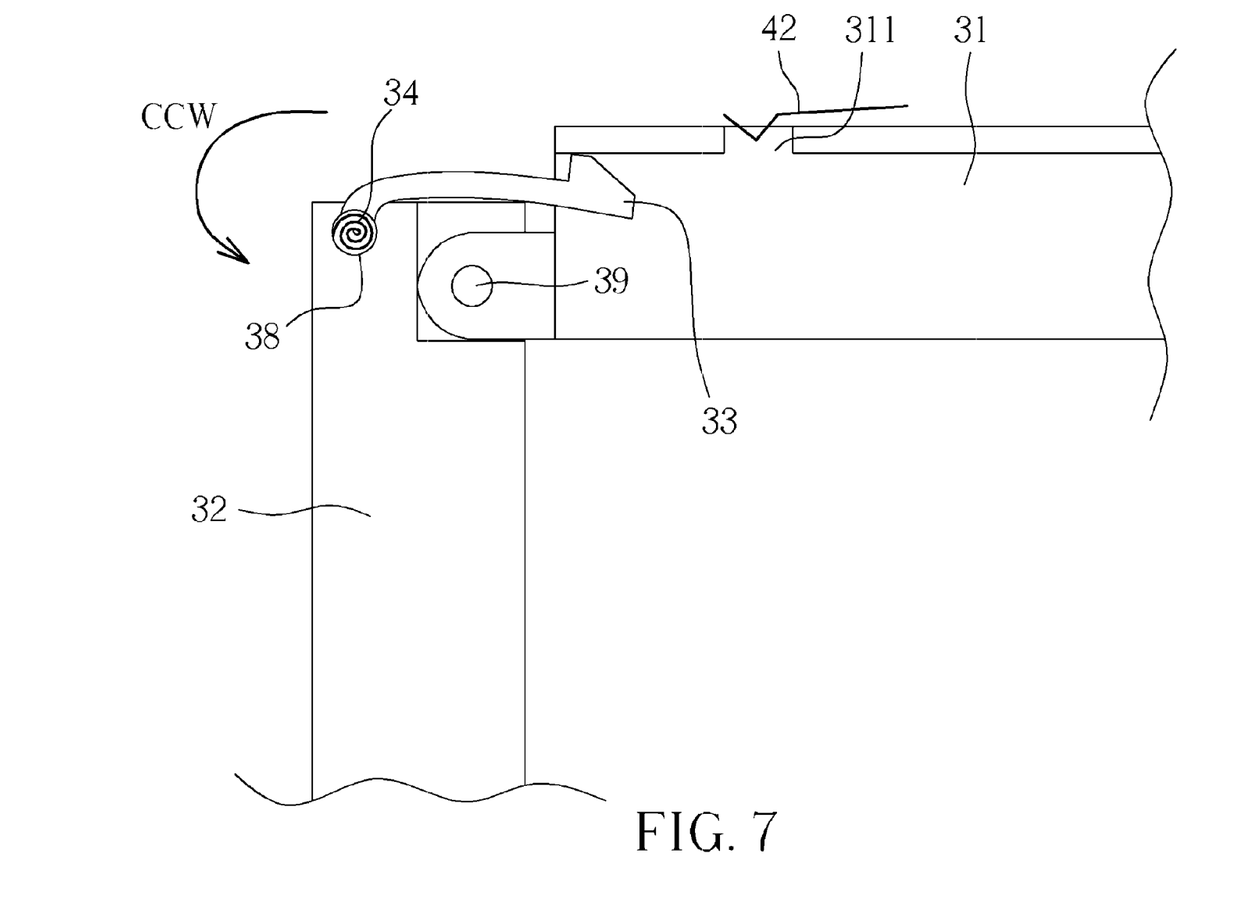
FIG. 7 is a schematic diagram showing the touch device in a bending style.

Please refer to FIG. 5, FIG. 6, and FIG. 7. FIG. 5 shows a schematic diagram of a touch device 3 according to a second embodiment of the application, FIG. 6 is a schematic diagram showing that the touch device 3 is pushed to release by a resilient bump 42 of a portable device, and FIG. 7 is a schematic diagram showing the touch device 3 in a bending style. The touch device 3 according to the second embodiment includes a first body 31 and a second body 32, which pivots to the first body 31 via a pivoting rivet 39 and is rotatable between a straight position as shown in FIG. 5, FIG. 6 and a bending position as shown in FIG. 7. The touch device 7 further includes a hook-like restraining member 33 fixedly connected to a connecting point 38 of the second body 32. The restraining member 33 can engage with a engaging section 311 on the first body 31, which is a through hole that passes through the wall of the first body 31 in this embodiment, and restrain the second body 32 from rotating relative to the first body 31, thereby configuring the touch device 3 at a straight pen style for use as a stylus.

When the touch device 3 is drawn out of a container of the portable device, the resilient bump 42 of the container pushes the restraining member 33 and disengages the restraining member 33 from the engaging section 311, which is shown in FIG. 6. Since the restraining member 33 in this embodiment can be a flexible thin clip spring, with fixed length and capable of restraining movement of the second body 32 when configured in the state in FIG. 5, the restraining member 33 is allowed to face lateral force and slightly deform, thereby allowing the second body 32 to rotate to the bending position relative to the first body 31. The touch device 3 can function as a support frame for a portable device when only the second body 32 is reaching out of the portable device. Additionally, the restraining member 33 can also be fixed to the second body 32 via a torsion spring 34 further configured at the connecting point 38. The restraining member 33 is securely engaged with the engaging section 311 of the first body 31 due to the spring force of the torsion spring 34.

Figure 8:
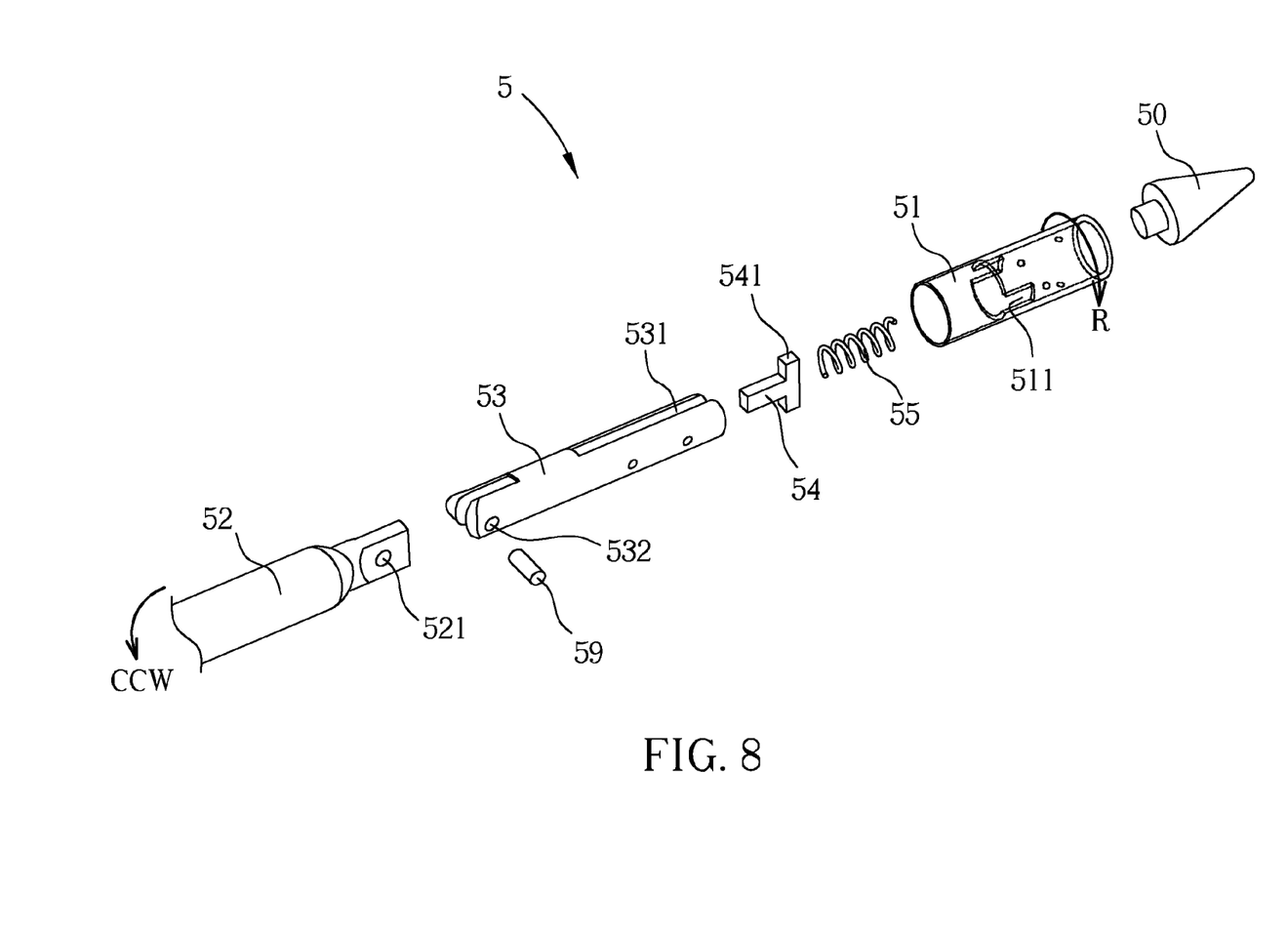
FIG. 8 is a schematic diagram of an exploded view of a touch device according to a third embodiment of the application.
Figure 9:
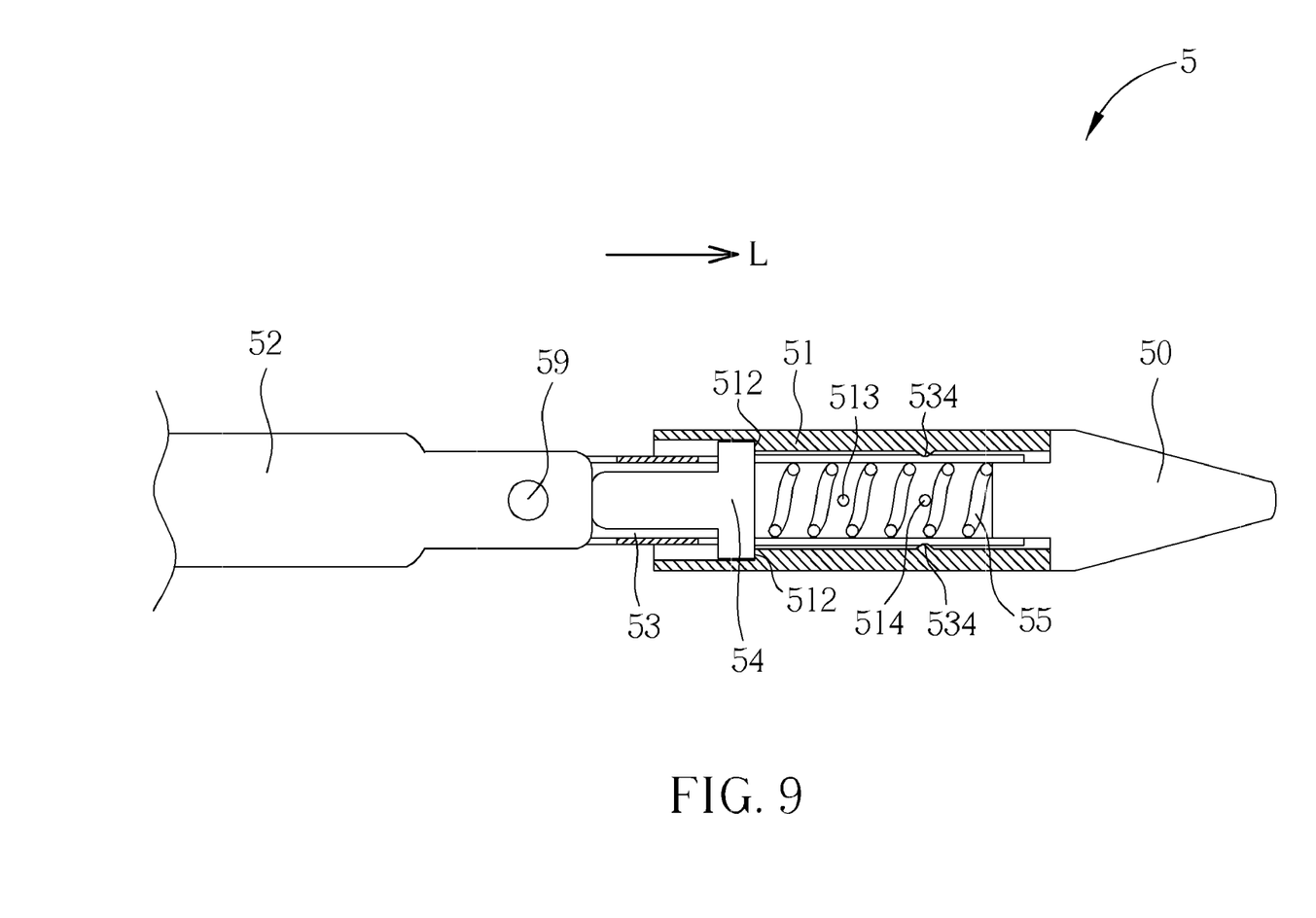
FIG. 9 is a schematic diagram showing the touch device in a straight pen style.
Figure 10:
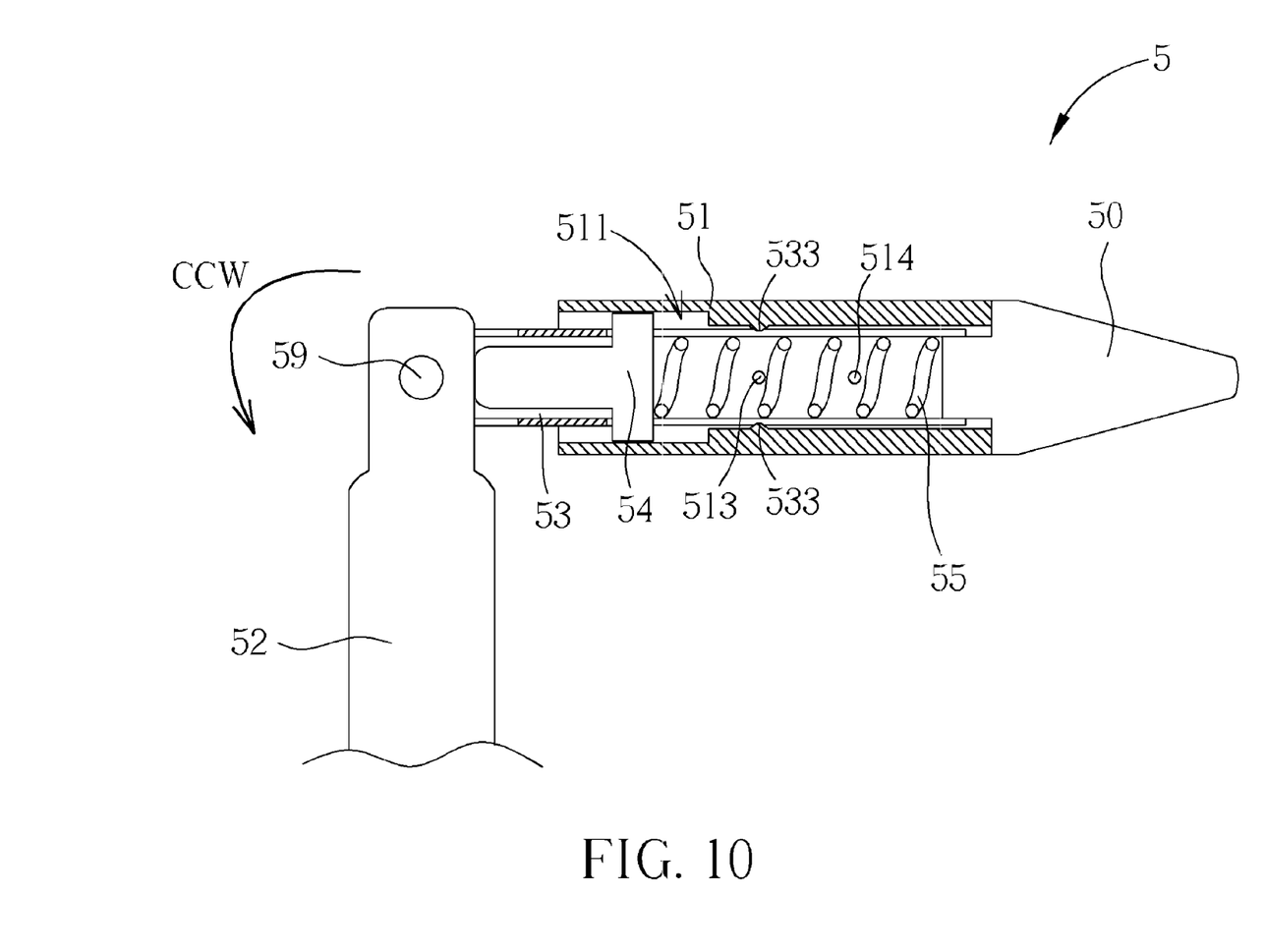
FIG. 10 is a schematic diagram showing the touch device in a bending style.

Please refer to FIG. 8, FIG. 9, and FIG. 10. FIG. 8 is a schematic diagram of an exploded view of a touch device 5 according to a third embodiment of the application, FIG. 9 is a schematic diagram showing the touch device 5 in a straight pen style, and FIG. 10 is a schematic diagram showing the touch device 5 in a bending style. The touch device 5 includes a touch end 50, a first body 51, a second body 52, a rotation seat 53, an engaging piece 54, and a first spring 55. The second body 52 is pivoted to the first body 51 via the rotation seat 53 and the engaging piece 54 and is rotatable relative to the first body 51 between a straight position and a bending position. Please refer to FIG. 8 and FIG. 9. The first body 51 is hollow with the first spring 55 configured therein and connecting between the first body 51 and the engaging piece 54. The rotation seat 53 incorporates with the engaging piece 54 and both are configured at the end of the first body 51. The engaging piece 54 is configured in a channel 531 of the rotation seat 53 and is slightly moveable in the channel 531. The rotation seat 53 along with the engaging piece 54 is also rotatable on the first body 51 along direction R, or reverse of direction R. The rotation seat 53 has pivoting holes 532 at one end while the second body 52 also has pivoting holes 521 at an end corresponding to the rotation seat 53. By passing a pivoting rivet 59 through the pivoting holes 532 and the pivoting holes 521, the second body 52 is rotatable on the rotation seat 53 along direction CCW, or reverse of direction CCW. The rotation seat 53 and the engaging piece 54 can also be moved by the second body 52 to rotate on the first body 51 along direction R, or reverse of direction R.

When the touch device 5 is configured at the straight pen style as shown in FIG. 9, the second body 52 that pivots to the rotation seat 53 is configured at a straight position relative to the first body 51, and because the engaging piece 54 is abutting against the second body 52 and a step section 512 at the inner wall of the first body 51 when the touch device 5 is configured at the straight pen style, the second body 52 is not allowed to move laterally along direction L but only rotatable along direction R on the first body 51. The second body 52 is now securely abutted by the engaging piece 54 and can not rotate relative to the rotation seat 53 along direction CCW. The rotation seat 53 and the engaging piece 54, which form the restraining member of the touch device 5, can effectively engage between the first body 51 and the second body 52 and keep the second body 52 from rotating relative to the first body 51 along direction CCW and retain the second body 12 at the straight position.

When the second body 52 rotates along direction R (or reverse direction) relative to the first body 51, the rotation seat 53 and the engaging piece 54 also rotate until a T-shape end 541 of the engaging piece 54 aligns with a long recess 511 of the first body 51, and at such state, the engaging piece 54 is moveable along direction L on the first body 51. The second body 52 is now rotatable along direction CCW by pushing the engaging piece 54 into the long recess 511 and be configured at a bending position as shown in FIG. 10. The first spring 55 connecting between the engaging piece 54 and the touch end 50 is also compressed and has bias for pushing the engaging piece 54 toward the second body 52. As the second body 52 is now at a relative bending position to the rotation seat 53, the first spring 55 can push the engaging piece 54 to abut against the side wall of the second body 52 for further retaining the second body 52 at the bending position shown in FIG. 10.

Figure 11:
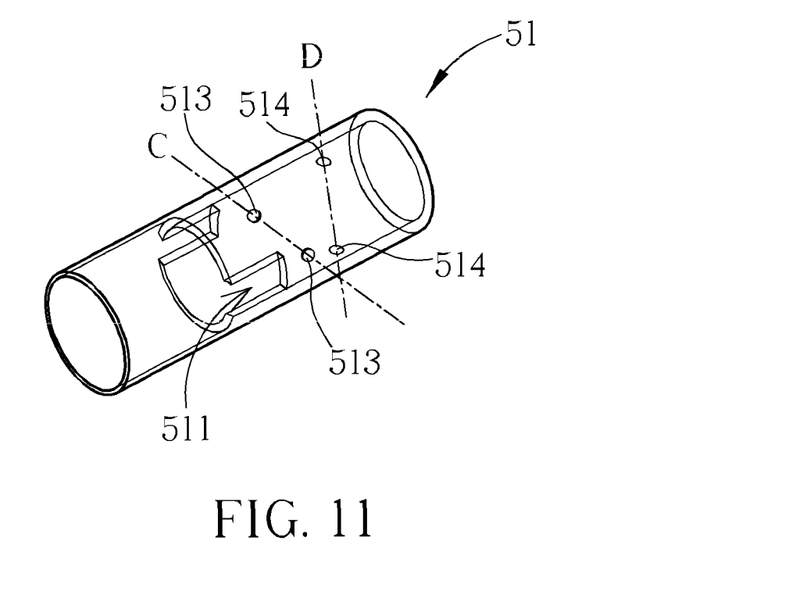
FIG. 11 is a schematic diagram of the first body according to the third embodiment.
Figure 12:
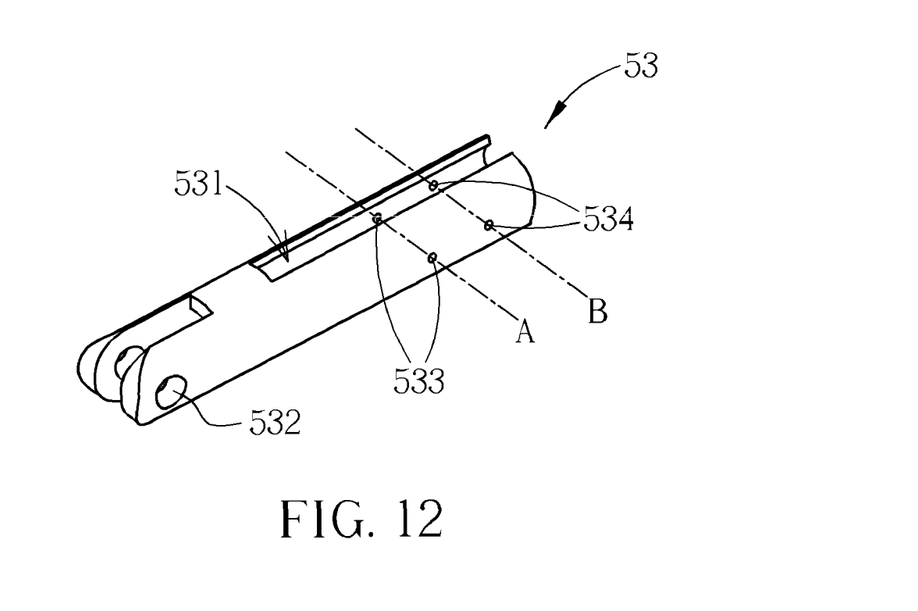
FIG. 12 is a schematic diagram of the rotation seat according to the third embodiment.
Figure 13:
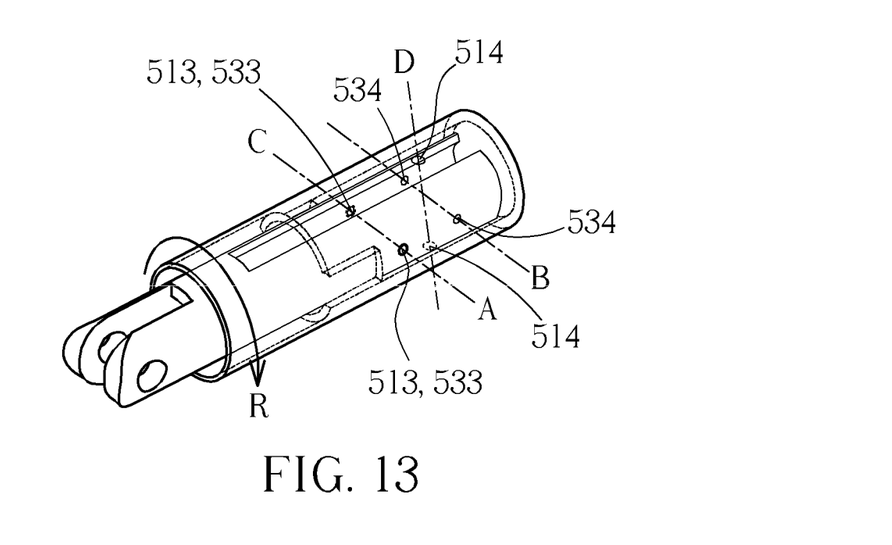
FIG. 13 is a schematic diagram showing one state between the rotation seat and the first body of the third embodiment.
Figure 14:
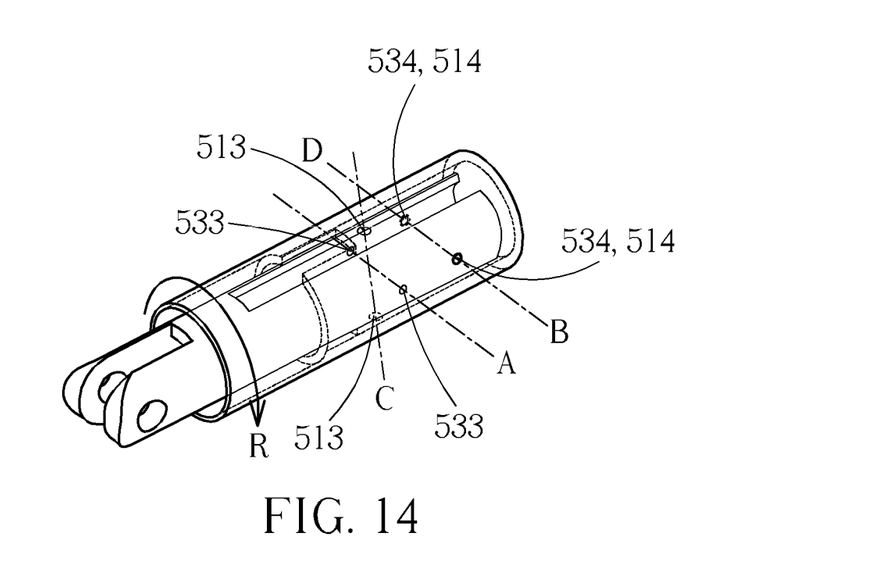
FIG. 14 is a schematic diagram showing another state between the rotation seat and the first body of the third embodiment.

Please refer to FIG. 11 to FIG. 14. FIG. 11 is a schematic diagram of the first body 51 where the inner structure is shown by illustrating the wall of the first body 51 transparent, FIG. 12 is a schematic diagram of the rotation seat 53, FIG. 13 is a schematic diagram showing one state between the rotation seat 53 and the first body 51 of the third embodiment, and FIG. 14 is a schematic diagram showing another state between the rotation seat 53 and the first body 51 of the third embodiment. When the second body 52 of the touch device 5 rotates along direction R on the first body 51, the first body 51 and the rotation seat 53 have their respective engaging portion such that the second body 52 can be retained at a certain position when rotating relative to the first body 51 (or the first body 51 rotates relative to the second body 52) every 90 degree. As FIG. 11 shows, an inner wall of the first body 51 has first bulges 513 and second bulges 514 wherein the inner wall facing the rotation seat 53; in addition, both the first bulges 513 and the second bulges 514 protrude oppositely from the inner wall of the first body 51 where the imaginary extension line C that passes through the first bulges 513 is perpendicular to the imaginary extension line D that passes through the second bulges 514. As FIG. 12 shows, an outer wall of the rotation seat 53 has first retaining portions 533 and second retaining portions 534 wherein the outer wall facing the first body 51; in addition, both the first retaining portions 533 and second retaining portions 534 are located oppositely at the outer wall of the rotation seat 53 where the imaginary extension line A that passes through the first retaining portions 533 is parallel to the imaginary extension line B that passes through the second retaining portions 534. When the rotation seat 53 is configured in the first body 51, the first bulges 513 and the first retaining portions 533 are locating on a first cross-section plane in space, and the second bulges 514 and the second retaining portions 534 are locating on a second cross-section plane in space. The first cross-section plane and the second cross-section plane are locating at different positions axially along the touch device 5.

Please refer to FIG. 13 and FIG. 14. When the first body 51 rotates to the position relative to the second body 52 as shown in FIG. 13, the first bulges 513 engage with the first retaining portions 533, which means the extension line A is overlapped with the extension line C and the extension line B is perpendicular to the extension line D. The rotation between the first body 51 and the second body 52 is held thereafter and the touch device 5 can be retained at the straight pen style. When the first body 51 keeps rotating to the position relative to the second body 52 as shown in FIG. 14, the second bulges 514 engage with the second retaining portions 534 (the first bulges 513 now disengage from the first retaining portions 533), which means the extension line B is overlapped with the extension line D and the extension line A is perpendicular to the extension line C. The rotation between the first body 51 and the second body 52 is again held thereafter and the touch device 5 can be bended for a support frame, which means that the T-shaped end 541 of the engaging piece 54 now aligns with the long recess 511 of the first body 51 and is moveable along direction L as shown in FIG. 9 and the second body 52 can push the engaging piece 54 into the long recess 511 by rotating along direction CCW. The bulges 513,514 and the retaining portions 533,534 respectively matching successively allows the first body 51 to engage with the second body 52 every 90 degree of rotation. And every time the bulges engage or disengage with corresponding retaining portions, the touch device 5 generates a click-point feedback that can tell a user the related positions between the first body 51 and the second body 52, and whether the rotation is done.

Figure 15:
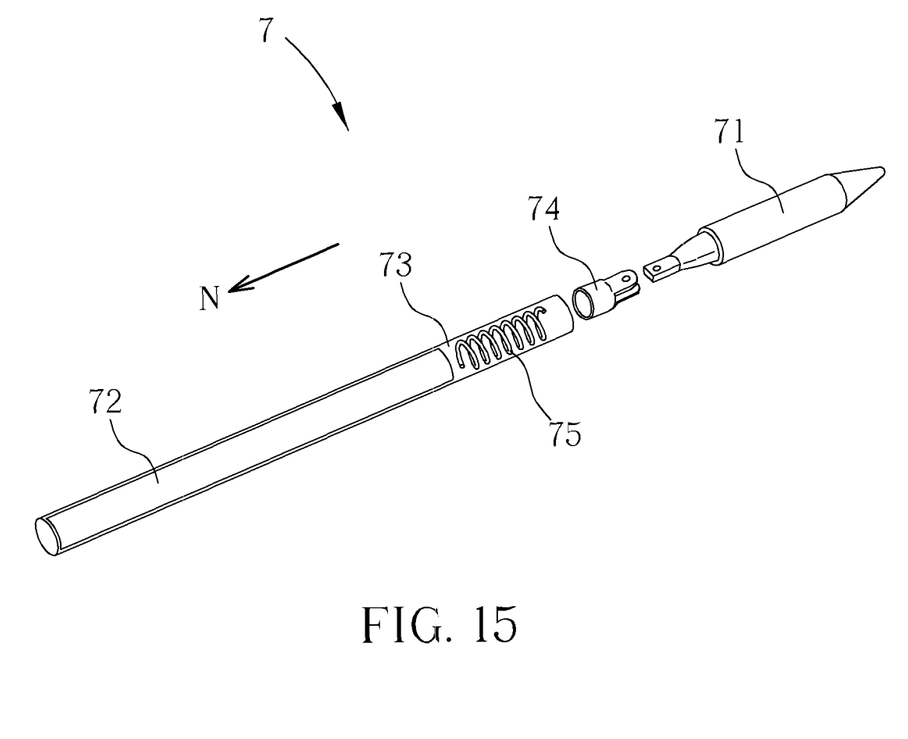
FIG. 15 is a schematic diagram of an exploded view of a touch device according to a fourth embodiment of the application.

Please refer to FIG. 15, which is a schematic diagram of an exploded view of a touch device 7 according to a fourth embodiment of the application. The touch device 7 includes a first body 71, a second body 72, and a restraining member 73. The second body 72 pivots to the first body 71 via a rotation seat 74 and is rotatable relative to the first body 71 between a straight position and a bending position. The restraining member 73 can be a sleeve that encloses and fixes to the second body 72 and also encloses the pivoting end of the rotation seat 74 and the first body 71 when the touch device 7 is configured as a stylus, which in other words, the second body 72 can not rotate relative to the first body 71 and is retained at the straight position. The restraining member 73 can also be moved away from enclosing the pivoting end of the rotation seat 74 with the first body 71. A first spring 75 is connected between the second body 72 and the rotation seat 74. When pulling the restraining member 73 and the second body 72 along direction N, the restraining member 73 is moved away from enclosing the pivoting end of the rotation seat 74 and the first body 71, thereby allowing the second body 72 to rotate relative to the first body 71 to a bending position. The first spring 75 is also stretched by the rotation seat 74 and the second body 72 and has bias to move the second body 72 and the restraining member 73 along the reverse direction of direction N toward the first body 71 such that the restraining member 73 encloses the pivoting end of the rotation seat 74 and the first body 71 again once the second body 72 rotates to the straight position relative to the first body 71.

The application discloses a touch device that can be used as a stylus or a support frame and includes a first body at the front end and a second body at the back end, where the second body pivots to the first body and is capable of rotating between a straight position and a bending position. The touch device further includes a restraining member selectively moving to engage between the first body and the second body such that the touch device can be retained at a straight pen style with buckling-proof capability, or at a bending style for supporting a portable device. When the touch device is drawn out of the portable device, the restraining member can further be pushed to disengage the second body from the first body by a resilient bump inside the housing of the portable device, so that the touch device can be released from the straight pen style and bended accordingly.

Those skilled in the art will readily observe that numerous modifications and alterations of the device and method may be made while retaining the teachings of the invention.

What is claimed is:

1. A bendable touch device, comprising:
   a first body having a touch end utilized for operating a touch display directly;
   a second body comprising a pivot, the second body directly connected to the first body and pivoting to the first body through the pivot and convertible between a first position and a second position relative to the first body, wherein the pivot is unmovable with respect to the first body;
   a restraining member enclosing and moveable on the first body to enclose the pivot to retain the second body at the first position or moveable on the first body to disclose the pivot such that the second body is pivotable to the second position relative to the first body; and
   a spring element connected between the restraining member and the first body wherein the spring element is compressed when the restraining member moves to disclose the pivot and the spring element provides a force to move the restraining member to enclose the pivot when the second body is pivoted to the first position relative to the first body.

2. The touch device of claim 1, wherein the restraining member comprises a protrusion and when the touch device moves in a container of a portable device wherein the container comprises a resilient bump, the protrusion is pushed by the resilient bump to drive the restraining member relative to the first body.

3. The touch device of claim 1, wherein the second body comprises an abutting edge and the restraining member encloses the pivot and abuts the abutting edge.

4. The touch device of claim 1, wherein the first body comprises an engaging section and the restraining member is a hook connecting to the second body and has engagement with the engaging section for retaining the second body at the first position.

5. The touch device of claim 4, wherein the engaging section is a through hole passing through the wall of the first body.

6. The touch device of claim 1, wherein the restraining member comprises a rotation seat; the second body pivots to the rotation seat and is rotatable along a first direction relative to the rotation seat, and the rotation seat is configured in the first body and rotatable along a second direction relative to the first body.

7. The touch device of claim 6, wherein the restraining member further comprises an engaging piece and the rotation seat further comprises a channel, the engaging piece configured in the channel for abutting the second body and retaining the second body at the first position.

8. The touch device of claim 7, wherein the engaging piece comprises a T-shape end and the first body comprises a long recess; when the rotation seat rotates along the second direction relative to the first body and the T-shape end aligns with the long recess, the second body can be rotated relative to the rotation seat along the first direction, the engaging piece is slidable in the channel, and the T-shape end engages with the long recess.

9. The touch device of claim 7, wherein the spring element is connected between the engaging piece and the first body and is compressed when the second body rotates relative to the rotation seat along the first direction to drive the engaging piece to slide in the channel and engage with the long recess.

10. The touch device of claim 6, wherein a wall of the rotation seat comprises a first retaining portion and a second retaining portion and the wall faces the first body, and a wall of the first body comprises a first bulge and a second bulge and the wall faces the rotation seat and corresponding to the first retaining portion and the second retaining portion respectively, wherein the first bulge engages with the first retaining portion or the second bulge engages with the second retaining portion as the rotation seat rotates relative to the first body along the second direction.

11. The touch device of claim 10, wherein a first cross-section plane and a second cross-section plane in space are defined when the rotation seat is configured in the first body; the first retaining portion and the first bulge locate on the first cross-section plane, the second retaining portion and the second bulge locate on the second cross-section plane, and the first bulge engages with the first retaining portion and the second bulge engages with the second retaining portion sequentially when the rotation seat rotates for every 90 degree relative to the first body.

12. The touch device of claim 1, wherein the touch device is straight pen style when the second body is converted to the first position relative to the first body.

13. The touch device of claim 1, wherein the touch device is L-shape when the second body is converted to the second position relative to the first body.

14. The touch device of claim 1, wherein the touch device is a stylus.

15. A portable device having a bendable touch device, comprising:
    a housing comprising a container; and
    a touch device moveably contained in the container and releasable from the housing by drawing out of the container, the touch device comprising:
      a first body having a touch end utilized for operating a touch display directly;
      a second body comprising a pivot, the second body directly connected to the first body and pivoting to the first body through the pivot and convertible between a first position and a second position relative to the first body, wherein the pivot is unmovable with respect to the first body;
      a restraining member enclosing and moveable on the first body to enclose the pivot to retain the second body at the first position or moveable on the first body to disclose the pivot such that the second body is pivotable to the second position relative to the first body; and
      a spring element connecting between the restraining member and the first body wherein the spring element is compressed when the restraining member moves to disclose the pivot and the spring element provides a force to move the restraining member to enclose the pivot when the second body is pivoted to the first position relative to the first body.

16. The portable device of claim 15, wherein the restraining member comprises a protrusion and the container comprises a resilient bump; when the touch device moves in the container, the protrusion is pushed by the resilient bump to drive the restraining member relative to the first body.

17. The portable device of claim 15, wherein the second body comprises an abutting edge and the restraining member encloses the pivot and abuts the abutting edge.

18. The portable device of claim 15, wherein the first body comprises an engaging section and the restraining member is a hook connecting to the second body and has engagement with the engaging section for retaining the second body at the first position.

19. The portable device of claim 18, wherein the engaging section is a through hole passing through the wall of the first body.

20. The portable device of claim 19, wherein the container comprises a resilient bump, and when the touch device moves in the container, the hook is pushed by the resilient bump to disengage from the engaging section.

21. The portable device of claim 15, wherein the restraining member comprises a rotation seat; the second body pivots to the rotation seat and is rotatable along a first direction relative to the rotation seat, and the rotation seat is configured in the first body and rotatable along a second direction relative to the first body.

22. The portable device of claim 21, wherein the restraining member further comprises an engaging piece and the rotation seat further comprises a channel, the engaging piece configured in the channel for abutting the second body and retaining the second body at the first position.

23. The portable device of claim 22, wherein the engaging piece comprises a T-shape end and the first body comprises a long recess; when the rotation seat rotates along the second direction relative to the first body and the T-shape end aligns with the long recess, the second body can be rotated relative to the rotation seat along the first direction, the engaging piece is slidable in the channel, and the T-shape end engages with the long recess.

24. The portable device of claim 22, wherein the spring element is connected between the engaging piece and the first body and is compressed when the second body rotates relative to the rotation seat along the first direction to drive the engaging piece to slide in the channel and engage with the long recess.

25. The portable device of claim 15, wherein the touch device is straight pen style when the second body is converted to the first position relative to the first body.

26. The portable device of claim 15, wherein the touch device is L-shape and supportive to the portable device when the second body is converted to the second position relative to the first body.

27. The portable device of claim 15, wherein the touch device is a stylus.

28. The portable device of claim 15, wherein the portable device is a mobile phone, a personal digital assistant (PDA), a smart phone, a portable navigation device (PND), or a global positioning system (GPS).

* * * * *